United States Patent
Chandra et al.

(10) Patent No.: US 11,095,742 B2
(45) Date of Patent: Aug. 17, 2021

(54) QUERY PROXY FOR DELIVERY OF DYNAMIC SYSTEM STATE

(71) Applicant: Juniper Networks, Inc., Sunnyvale, CA (US)

(72) Inventors: Mariganti Sarath Chandra, Bangalore (IN); Vinod B C, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/365,954

(22) Filed: Mar. 27, 2019

(65) Prior Publication Data

US 2020/0314197 A1  Oct. 1, 2020

(51) Int. Cl.
*H04L 29/08* (2006.01)
*G06F 9/50* (2006.01)
*G06F 9/54* (2006.01)

(52) U.S. Cl.
CPC ........ *H04L 67/2804* (2013.01); *G06F 9/5072* (2013.01); *G06F 9/54* (2013.01); *H04L 67/02* (2013.01)

(58) Field of Classification Search
CPC ....... H04L 67/2804; H04L 67/02; G06F 9/54; G06F 9/5072
See application file for complete search history.

(56) References Cited

U.S. PATENT DOCUMENTS

| 5,968,122 A | 10/1999 | Schlosser et al. |
| 6,721,880 B1 | 4/2004 | Pike |
| 6,792,461 B1 * | 9/2004 | Hericourt ................ H04L 29/06 370/230 |
| 6,876,625 B1 * | 4/2005 | McAllister .......... H04L 41/0654 370/221 |

(Continued)

FOREIGN PATENT DOCUMENTS

| CN | 1881945 A | 12/2006 |
| CN | 101136730 A | 3/2008 |

(Continued)

OTHER PUBLICATIONS

Extended Search Report from counterpart European Application No. 19181484.7, dated Dec. 18, 2019, 9 pp.

(Continued)

*Primary Examiner* — John A Follansbee
*Assistant Examiner* — Lam T Do
(74) *Attorney, Agent, or Firm* — Shumaker & Sieffert, P.A.

(57) ABSTRACT

In general, techniques are described for providing a dynamic system state for a distributed operating system. A network device comprises a plurality of hardware computing nodes configured to execute a distributed operating system that provides an execution environment in which a plurality of applications is executed. A computing node of the plurality of computing nodes is configured to configure a dynamic state application to operate as a proxy to receive one or more (Continued)

requests for state information stored in a data store. The computing node retrieves the state information stored in the data store; stores the retrieved state information in a local data store of the computing node; receives one or more requests for the state information; and sends a response including the requested state information from the local data store.

20 Claims, 5 Drawing Sheets

(56) References Cited

U.S. PATENT DOCUMENTS

| | | | |
|---|---|---|---|
| 6,965,936 B1 | 11/2005 | Wipfel et al. | |
| 6,986,076 B1 | 1/2006 | Smith | |
| 7,275,081 B1 | 9/2007 | Katz et al. | |
| 7,518,986 B1 | 4/2009 | Chadalavada et al. | |
| 7,702,640 B1 | 4/2010 | Vermeulen et al. | |
| 7,739,403 B1 | 6/2010 | Balakrishna et al. | |
| 7,917,578 B1 | 3/2011 | Katz et al. | |
| 8,798,055 B1 | 8/2014 | An | |
| 9,244,994 B1 | 1/2016 | Adoc et al. | |
| 9,424,140 B1 | 8/2016 | Madhavarapu et al. | |
| 10,015,264 B2* | 7/2018 | Lancaster | H04L 67/141 |
| 10,104,039 B1* | 10/2018 | Knecht | H04L 61/2592 |
| 10,182,105 B2 | 1/2019 | Srinivasan et al. | |
| 10,552,442 B1* | 2/2020 | Lusk | G06F 16/284 |
| 10,887,173 B2 | 1/2021 | Katz et al. | |
| 2002/0083073 A1 | 6/2002 | Vaidya et al. | |
| 2002/0161889 A1 | 10/2002 | Gamache et al. | |
| 2003/0055892 A1 | 3/2003 | Huitema et al. | |
| 2004/0220979 A1 | 11/2004 | Young et al. | |
| 2005/0013310 A1 | 1/2005 | Banker et al. | |
| 2005/0240644 A1 | 10/2005 | Van Berkel et al. | |
| 2006/0059287 A1 | 3/2006 | Rivard et al. | |
| 2006/0067210 A1 | 3/2006 | Liu et al. | |
| 2006/0277284 A1 | 12/2006 | Boyd | |
| 2008/0288747 A1 | 11/2008 | Inglett et al. | |
| 2008/0294732 A1 | 11/2008 | Fletcher et al. | |
| 2009/0077269 A1 | 3/2009 | Goldstein et al. | |
| 2009/0138757 A1 | 5/2009 | Matsumoto et al. | |
| 2010/0128638 A1 | 5/2010 | Navas et al. | |
| 2010/0257149 A1 | 10/2010 | Cognigni et al. | |
| 2010/0309933 A1 | 12/2010 | Stark et al. | |
| 2011/0013508 A1 | 1/2011 | Tuplur et al. | |
| 2011/0090787 A1 | 4/2011 | Smith et al. | |
| 2011/0099266 A1 | 4/2011 | Calder et al. | |
| 2011/0238793 A1 | 9/2011 | Bedare et al. | |
| 2012/0266024 A1 | 10/2012 | Jackson | |
| 2013/0232545 A1* | 9/2013 | Ma | G06F 21/6218 726/3 |
| 2013/0282920 A1 | 10/2013 | Zhang et al. | |
| 2013/0318571 A1 | 11/2013 | Radzikowski et al. | |
| 2014/0115137 A1 | 4/2014 | Keisam | |
| 2014/0165015 A1 | 6/2014 | Baumgartner et al. | |
| 2014/0188794 A1 | 7/2014 | Dalton | |
| 2015/0248448 A1 | 9/2015 | Tsirkin | |
| 2016/0191611 A1 | 6/2016 | Srinivasan et al. | |
| 2016/0191613 A1 | 6/2016 | Srinivasan et al. | |
| 2016/0285678 A1 | 9/2016 | Rath et al. | |
| 2016/0328463 A1 | 11/2016 | Adoc et al. | |
| 2017/0214738 A1 | 7/2017 | Agarwal et al. | |
| 2017/0302502 A1 | 10/2017 | Feng | |
| 2018/0176082 A1 | 6/2018 | Katz et al. | |
| 2018/0176093 A1 | 6/2018 | Katz et al. | |
| 2018/0176120 A1 | 6/2018 | Katz et al. | |
| 2020/0314197 A1 | 10/2020 | Chandra et al. | |

FOREIGN PATENT DOCUMENTS

| | | | |
|---|---|---|---|
| CN | 101308513 A | 11/2008 | |
| CN | 102202073 A | 9/2011 | |
| CN | 102202104 A | 9/2011 | |
| CN | 103379129 A | 10/2013 | |
| CN | 105743692 A | 7/2016 | |
| EP | 1117040 A2 | 7/2001 | |
| EP | 1793542 A2 | 6/2007 | |
| EP | 2771789 A1 | 9/2014 | |
| EP | 2919130 A1 | 9/2015 | |
| EP | 2930902 A3 | 10/2015 | |
| EP | 3128720 A1 | 2/2017 | |
| EP | 3340055 A1 * | 6/2018 | G06F 9/54 |
| WO | 2001014948 A2 | 3/2001 | |
| WO | 2015036791 A1 | 3/2015 | |
| WO | 2016106682 A1 | 7/2016 | |

OTHER PUBLICATIONS

U.S. Appl. No. 14/867,325, by Juniper, Inc., (Inventors: Srinivasan et al.), filed Sep. 28, 2015.

U.S. Appl. No. 15/198,912, filed Jun. 30, 2016, Juniper Networks, Inc. (inventor: Srinivasan et al.) entitled Hierarchical Naming Scheme for State Propagation Within Network Devices.

"Junos XML Management Protocol Developer Guide" Junos OS, Juniper Networks, Inc., Feb. 14, 2019, 426 pp.

"REST API Guide" Junos OS, Juniper Networks, Inc., Aug. 21, 2018, 50 pp.

"Introducing Microsoft Cluster Service (MSCS) in the Windows Server 2003 Family" Microsoft Docs, Nov. 2002, updated Sep. 9, 2006, 17 pp.

U.S. Appl. No. 17/135,421, filed Dec. 28, 2020, naming inventors Katz et al.

Response to Extended Search Report dated Dec. 18, 2019 from counterpart European Application No. 19181484.7, filed Mar. 30, 2021, 17 pp.

* cited by examiner

QUERY PROXY FOR DELIVERY OF DYNAMIC SYSTEM STATE

TECHNICAL FIELD

The disclosure relates to network devices and, more particularly, to operating systems for network devices.

BACKGROUND

Operating systems for network devices, such as routers, function to provide an execution environment in which various applications (such as network protocols, maintenance interfaces, virtualization applications, etc.) may execute. One function of the operating system of a router is to establish a way by which state information may be propagated to the various components or, in other words, computing nodes of the router to allow the router to correctly route network traffic within a network.

A router may, for example, maintain state information representing the current state of resources of the router. For example, the router maintains state information representing the state of the interfaces between the router and the network. Such state information may include information representing the state of one or more interface cards (IFCs), such as the current configuration of the IFCs. As additional examples, a router may maintain state information representing the state of one or more packet forwarding engines (PFEs), one or more routing engines, or other resources within the router.

A control node referred to as a "routing engine" operating within the router may execute an instance of the operating system to propagate the state information (and changes thereto) to various other processes or components within the router. These other processes or components are sometimes referred to as "consumers," because they receive and utilize (or, in other words, "consume") the state information maintained by the instance of the operating system. These consumers make use of the state information when performing their various functions.

In some examples, an operating system may be distributed across computing nodes of the router, which may include routing engines, interface cards, packet forwarding engines, as well as non-networking nodes, such as processors, central processing units (CPUs), application specific integrated circuits (ASICs), graphical processing units (GPUs). For example, computing nodes may execute respective instances of the distributed operating system such that the operating system is distributed across all computing nodes. Each of the computing nodes may self-organize, coalescing so as to execute the single instance of the distributed operating system. The computing nodes executing respective instances of the distributed operating system may be configured to store state information in respective data structures.

SUMMARY

Techniques are described for providing a dynamic system state for a distributed operating system. For example, a distributed operating system for network devices may allow for dynamic expansion or contraction (or, in other words, "elasticity") of underlying hardware resources while also potentially providing robust convergence of state information across producing components (so-called "producers") and consuming components (so-called "consumers"). The operating system may be distributed across computing nodes (which may also be referred to as "hardware computing nodes," "computing nodes" or "nodes"), which may include routing engines, interface cards, packet forwarding engines, as well as non-networking nodes, such as processors, central processing units (CPUs), application specific integrated circuits (ASICs), graphical processing units (GPUs). The computing nodes may initially coalesce, starting from a kernel, detecting one another via an object flooding protocol (OFP) premised upon topology discovery similar to link state routing protocols, and organizing via a management process to execute the distributed operating system.

The distributed operating system may, once booted across the computing nodes, allow for real-time (or, near-real-time) construction of a synchronization tree for synchronizing databases of state information maintained by the distributed operating system. The operating system may synchronize the databases using OFP. The operating system may handle coherence among the computing nodes executing instances of the distributed operating system so that coherent state information may be maintained by each instance in the event of various connectivity or failures of the instances of the distributed operating system. In some examples, the synchronized databases of state information of the distributed operating system are collectively referred to as a distributed data store, e.g., an object daemon data store (DDS).

After coalescing to execute the single instance of distributed operating system, the computing nodes may execute a distributed application suite (e.g., network protocols, management interfaces, command line interfaces (CLIs), etc.), within the execution environment provided by the distributed operating system. Distributed operating system may distribute applications among the computing nodes supporting execution of distributed operating system based on computing node capability and/or role within the multi-chassis router. Distributed operating system may manage propagation of state information in support of the execution of distributed operating system and/or the applications executing within the execution environment provided by distributed operating system.

As one example of the techniques described herein, a dynamic state application is configured to operate as a proxy to receive one or more requests for state information in the DDS. For example, at least one compute node executing an instance of the distributed operating system may configure a dynamic state application to operate as a proxy (e.g., web server) to receive one or more requests from clients (e.g., web clients) and to retrieve state information from the DDS. The dynamic state application may, during initialization or with each update to state information in the DDS, retrieve state information from the DDS and store the retrieved state information in a local data store or memory. When dynamic state application receives one or more requests (e.g., Hyper-Text Transport Protocol (HTTP) requests) for state information in the DDS, the dynamic state application may retrieve the state information stored in its local data store or memory, and configures a response (e.g., Hypertext Markup Language (HTML) files) with the retrieved state information.

In this way, a dynamic state application may operate as a generic proxy application to receive one or more requests for state information from the DDS that may utilize web based queries, thereby providing a more flexible way to access state information from the DDS. That is, the dynamic state application may decide what information to provide and/or change the presentation of the information requested. Moreover, by configuring a dynamic state application as a web server, the dynamic state application is multi-threaded, which enables the dynamic state application to process multiple requests at a time.

In one example, a method comprises executing, by a plurality of hardware computing nodes included within a network device, a distributed operating system that provides an execution environment in which a plurality of applications is executed. The method also comprises configuring, by at least one of the plurality of hardware computing nodes, a dynamic state application to operate as a proxy to receive one or more requests for state information stored in a data store, wherein the state information comprises information representing different states for the plurality of applications. The method further comprises retrieving, by the dynamic state application, the state information stored in the data store. The method also comprises storing, by the dynamic state application, the retrieved state information in a local data store of the at least one of the plurality of hardware computing nodes. Moreover, the method comprises receiving, by the dynamic state application, the one or more requests for the state information. The method further comprises sending, by the dynamic state application and responsive to receiving the one or more requests, a response including the requested state information from the local data store.

In another example, a network device comprises a plurality of hardware computing nodes configured to execute a distributed operating system that provides an execution environment in which a plurality of applications is executed. At least one of the plurality of hardware computing nodes configured to configure a dynamic state application to operate as a proxy to receive one or more requests for state information stored in a data store, wherein the state information comprises information representing different states for the plurality of applications; retrieve the state information stored in the data store; store the retrieved state information in a local data store of the at least one of the plurality of hardware computing nodes; receive the one or more requests for the state information; and send, responsive to receiving the one or more requests, a response including the requested state information from the local data store.

In another example, a non-transitory computer-readable storage medium having stored thereon instructions that, when executed, cause one or more processors of a network device to: execute a distributed operating system that provides an execution environment in which a plurality of applications is executed; configure a dynamic state application to operate as a proxy to receive one or more requests for state information stored in a data store, wherein the state information comprises information representing different states for the plurality of applications; retrieve the state information stored in the data store; store the retrieved state information in a local data store; receive the one or more requests for the state information; and send, responsive to receiving the one or more requests, a response including the requested state information from the local data store.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
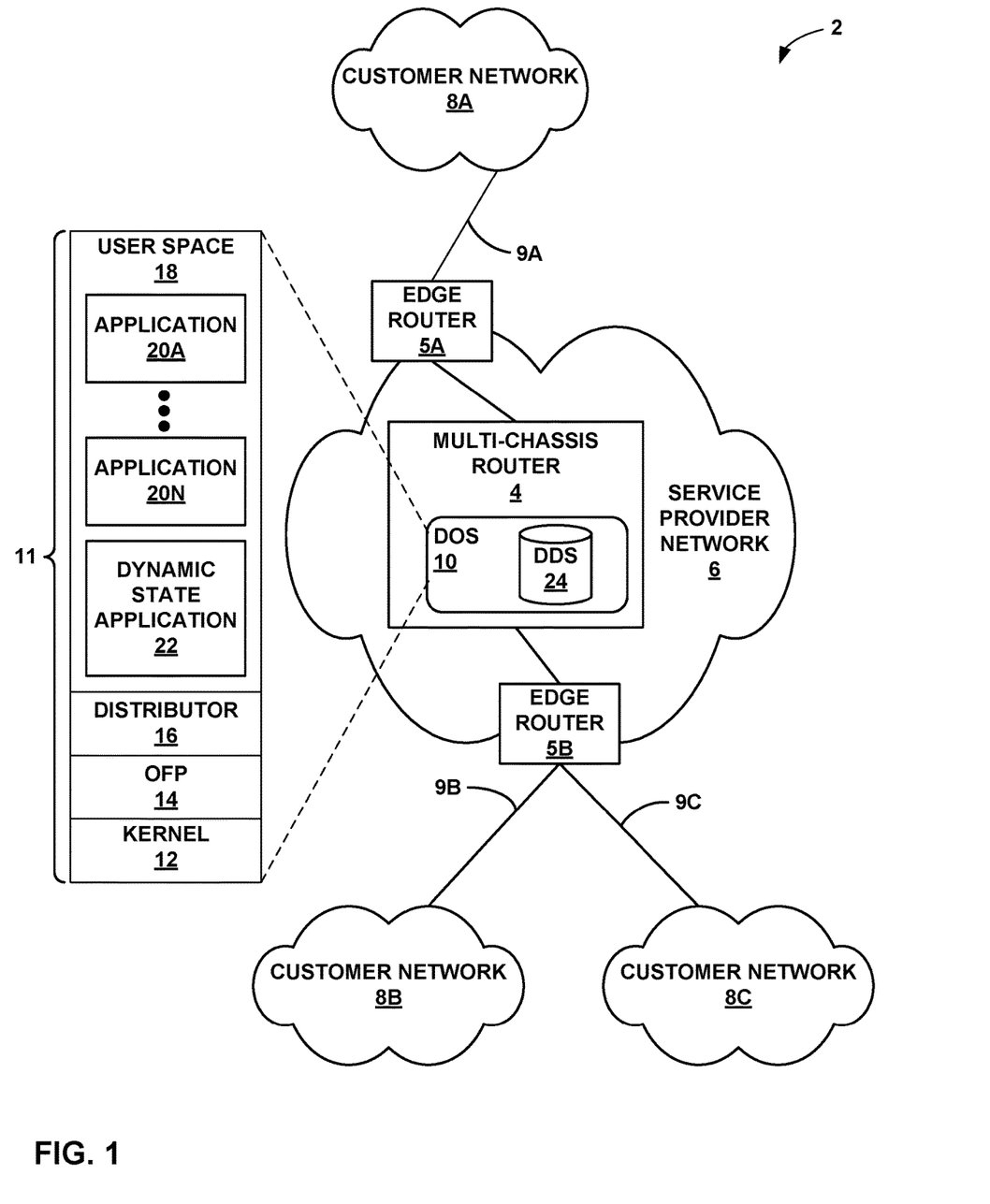
FIG. 1 is block diagram of an example network computing environment in which a service-provider network includes a multi-chassis router configured to operate in accordance with the distributed operating system techniques described in this disclosure.

FIG. 1 is a block diagram illustrating an example computing environment 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. In one example, multi-chassis router 4 includes a central switch card chassis (SCC) that operates as a control node and one or more line card chassis (LCCs) that operate as packet routing devices. The LCCs may contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. Service provider network 6 may include a variety of network devices other than multi-chassis router 4 and edge routers 5, such as additional routers, switches, servers, or other devices.

In the illustrated example, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, cellular phones (including so-called "smart phones"), tablet computers, workstations, servers, switches, printers, or other devices. The configuration of network 2 illustrated in FIG. 1 is merely an example. For example, service provider network 6 may be coupled to any number of customer networks 8. Nonetheless, for ease of description, only customer networks 8A-8C are illustrated in FIG. 1.

Multi-chassis router 4 may be configured to execute a single instance of an operating system across all computing nodes (which may collectively refer to all producers and consumers) of multi-chassis router 4. The operating system described in this disclosure may be referred to as a distributed operating system 10 ("DOS 10") in that execution of the operating system is distributed across all computing nodes. The computing nodes may include hardware computing nodes (such as routing engines, hardware forwarding units—which may include application specific integrated circuits, and interface cards) and virtual computing nodes executed by hardware control units (e.g., one or more processors, one or more application specific integrated circuits, field-programmable gate arrays, etc.).

Distributed operating system 10 may avoid redundant execution of separate instances of the same operating system, while simplifying propagation of state information by way of flooding in the form of multicast delivery of state information. Furthermore, the distributed operating system 10 may be resilient to computing node failure allowing for individual computing nodes supporting the distributed operating system to fail without requiring the reboot of the remaining computing nodes supporting execution of the single instance of the distributed operating system.

Computing nodes may coalesce to execute distributed operating system 10. For example, the computing nodes may discover one another (e.g., by using OFP), and are organized to execute a single instance of distributed operating system 10. After coalescing to execute the single instance of distributed operating system 10, the computing nodes may execute a distributed application suite within the execution environment provided by the distributed operating system. For example, the execution environment of distributed operating system 10 may include applications 20A-20N (collectively, "applications 20") of user space 18. Each of applications 20 may represent user-level processes that may run network management software, execute routing protocols to communicate with peer routing devices, execute configuration commands received from an administrator, maintain and update one or more routing tables, manage subscriber flow processing, create one or more forwarding tables, among other functions. Applications 20 may refer to any process that is not described above with respect to distributed operating systems 10, including Unix® daemons, and PFE applications (or, in other words, software) other than low level drivers and/or firmware.

The distributed operating system may, once booted across the computing nodes, allow for real-time (or, near-real-time) construction of a synchronization tree for synchronizing databases of state information maintained by the distributed operating system. State information may be, for example, state information for distributed operating system 10, and/or for one or more applications 20 executed in the execution space provided by distributed operating system 10. Computing nodes of multi-chassis router 4 executing respective instances of distributed operating system 10 may be configured to store state information in respective data structures, such as tree data structures. For example, the computing nodes may instantiate the tree data structures, such as radix tries. Radix tries are trees structured by its keys, for which every interior trie node has at least two children. To locate a trie node with a particular key, the tree is walked by examining the contents of the key, starting at the left-hand side. A radix trie is a minimal tree in that there are no internal trie nodes with only a single child. A Patricia Trie is a particular form of a radix trie.

The computing nodes may represent the state information as message fragments, where each message fragment is stored in a tree node of the tree data structure. The computing nodes may synchronize the tree data structures (e.g., using OFP) by flooding objects representative of the message fragments to the other computing nodes. For example, when one of the computing nodes of multi-chassis router 4 receives updated state information, the one of the computing nodes of multi-chassis router 4 may update its local tree data structure, then flood the updated state information to the other computing nodes. In this manner, the computing nodes can maintain synchronization between their respective data structures for storing state information for distributed operating system 10 and/or applications executed in an execution environment provided by distributed operating system 10. The synchronized data structures may collectively be referred to herein as a distributed data store or an object daemon data store (DDS), e.g., DDS 24.

Distributed operating system 10 may manage propagation of state information in support of the execution of distributed operating system 10 and/or the applications 20 executing within the execution environment provided by distributed operating system 10. For example, distributed operating system 10 may utilize a hierarchical naming scheme for propagating state information from producers to consumers. More information regarding the hierarchical naming scheme and how the hierarchical naming scheme may more efficiently propagate state information using an object flooding protocol (OFP) can be found in U.S. application Ser. No. 15/198,912, entitled "HIERARCHICAL NAMING SCHEME FOR STATE PROPAGATION WITHIN NETWORK DEVICES," filed Jun. 30, 2016, the entire contents of which are hereby incorporated by reference as if set forth in its entirety.

Additional examples of a distributed operating system are described in U.S. application Ser. No. 15/637,775, entitled "COMMUNICATING STATE INFORMATION IN DISTRIBUTED OPERATING SYSTEMS," filed Jun. 29, 2017, U.S. application Ser. No. 15/637,809, entitled "ORGANIZING EXECUTION OF DISTRIBUTED OPERATING SYSTEMS FOR NETWORK DEVICES," filed Jun. 29, 2017, and U.S. application Ser. No. 15/637,839, entitled "MAINTAINING COHERENCY IN DISTRIBUTED OPERATING SYSTEMS FOR NETWORK DEVICES," filed Jun. 29, 2017, the entire contents of each of which is incorporated by reference herein.

In some instances, clients may request state information from DDS 22. In examples where different applications produce different state information that is stored in DDS 24, existing request processes require queries to be sent to specific applications to retrieve respective state information from DDS 24. For example, application 20A is a producer of routing state information that is stored in DDS 24 and application 20N is a producer of interface state information that is stored in DDS 24. In this example, a request for the routing state information is sent to application 20A, which in turn retrieves the routing state information from DDS 24. Similarly, a request for interfaces state information is sent to application 20N, which in turn retrieves the interfaces state information from DDS 24. Since applications are distributed throughout compute nodes in a distributed operating system, these existing request processes must discover the location of the applications in order to send the requests to the appropriate applications.

Existing request processes may also be multi-hopped, which results in slower response times. As one example in which a CLI is used to request state information, each request configured via the CLI (e.g., a request in eXtensible Markup Language (XML) format) may be passed to the command line interface application, e.g., command daemon (cmdd), which translates the request to a query that conforms to specific semantics used by an application (e.g., a database daemon) with an interface supporting the semantics. The application receiving the query may retrieve the state information from DDS 24. The application may configure a response with the requested state information, which is converted by the cmdd to a response compatible with the CLI (e.g., in XML format).

In some examples, the existing request processes may use proprietary syntax to query state information from DDS 24. Using the example above, the cmdd may translate requests from the CLI (e.g., XML) to a proprietary query, (e.g., ddx request), and may also translate a proprietary response (e.g., ddx response) to a response compatible with the CLI (e.g., XML). The use of a proprietary syntax limits the request process to only clients that are familiar with the proprietary syntax.

Existing request processes are also single-threaded processes in which an application performs a query to the DDS each time it receives a request. That is, the CLI may only support processing of a single request at a time. The CLI is a run-to-completion process where each instance of the CLI may only process the single request at a time until the corresponding response is available and the response is returned to the current response, thereby potentially injecting delay into request processing. As such, in some examples in which the application receives multiple requests (e.g., a first request and a second request), the application is unable to process the second request until the application is finished querying the DDS based on the first request.

Moreover, by using CLI to request for state information from DDS 24, an entire XML file of state information is returned, not a particular object of the state information (e.g., discrete portion of state information). The CLI may, as a result, consume significant bandwidth (e.g., memory bus bandwidth) in communicating the entire XML file that may also results in further inefficiencies as the entire XML file must be processed in order to identify the relevant object to the request, thereby possibly consuming extra processing cycles.

In accordance with the techniques described in this disclosure, multi-chassis router 4 may include a plurality of computing nodes configured to execute a distributed operating system that provides an execution environment in which a dynamic state application 22 is executed to operate as a proxy to receive one or more requests for different state information in DDS 24. For example, at least one of the computing nodes of the multi-chassis router 4 that executes an instance of distributed operating system 10 may configure a dynamic state application 22. In some examples, a remote node, e.g., one of edge routers 5, that may execute an instance of distributed operating system 10 may execute the dynamic state application 22 using OFP.

In some examples, the at least one of the computing nodes that executes an instance of dynamic state application 22 may receive configuration information (e.g., via a configuration file, command line options, or other input handling mechanism) that defines parameters by which the dynamic state application 22 may operate as a proxy to receive one or more requests for different state information. For example, configuration information may include server parameters, serving parameters (e.g., output parameters), and/or a structure of a data store generated on the at least one of the computing nodes executing an instance of dynamic state application 22.

The configuration information may instruct the computing node that executes a respective instance of dynamic state application 22 to retrieve state information from DDS 24 (e.g., a subset of state information) and store the retrieved state information in a local data store or memory of the computing device. For example, the configuration information may instruct dynamic state application 22 to retrieve state information from DDS 24 during initialization and/or each time the state information in the DDS 24 is updated. The configuration information may also instruct the computing node that executes a respective instance of dynamic state application 22 to construct a local data store that stores the retrieved state information. The local data store may map objects of state information retrieved from DDS 24 to responses for requests from clients.

The server parameters of the configuration information may include parameters necessary for the computing node to operate as a server. Server parameters may include a port number, authentication, or the like. The computing node that executes a respective instance of dynamic state application 22 may expose an interface (e.g., port) based on the configuration information such that the computing node may receive one or more requests from a service endpoint, e.g., web client. In some examples, the computing node that executes an instance of dynamic state application 22 may configure a port to receive web requests, e.g., a HyperText Transport Protocol (HTTP) get requests. In this way, the dynamic state application 22 may operate as a web server at a pre-defined port to receive one or more web-based requests from web clients.

The serving parameters of the configuration information may include parameters for a response to a request for state information. For example, the serving parameters may include an output format for objects of the state information. As one example, the configuration information may cause the computing node to be implemented according to a representational state transfer (REST) software architecture to send and receive data-interchange formatted messages. Data-interface formatted messages may conform to an open standards format that uses human-readable text to transmit data objects that include attribute-value pairs. An example of a data-interface formatted message format is JavaScriptObject Notation (JSON), described in "JSON Web Token (MT)," Internet Engineering Task Force (IETF), Request for Comments 7519, May 2015, the entire contents of which is incorporated by reference herein.

Dynamic state application 22 may be multi-instance in that a plurality of computing nodes of multi-chassis router 4 may implement a respective instance of dynamic state application 22. For example, the configuration information may define a first computing node, e.g., routing engine, to execute a first instance of dynamic state application 22 to provide a view of a first subset of the state information, e.g., routing state information, and a second computing node to execute a second instance of dynamic state application 22 to provide a view of a second subset of the state information, e.g., interfaces state information.

In operation, dynamic state application 22 may, during initialization or an update to DDS 24, retrieve state information from DDS 24 and store the retrieved state information in a local data store or memory. Dynamic state application 22 may receive, for example, one or more requests (e.g., HTTP get requests) from a web client that requests for state information in DDS 24. Dynamic state application 22 may retrieve the state information stored in its local data store or memory, and may configure a response, e.g., a HyperText Markup Language file, with the retrieved state information. In some examples, dynamic state application 22 may include HTML tags with the response.

In some examples, dynamic state application 22 may also register for notifications via methods appropriate to get the requested state information. For example, dynamic state application 22 may implement a network interface library (e.g., IFLIB) on event handlers for speed notifications. In some other examples, dynamic state application 22 may be configured to listen for requests from existing request processes and from the request process in accordance with one or more aspects of the techniques described herein.

The techniques described herein may provide one or more technical advantages. For example, by configuring a dynamic state application to store state information, the dynamic state application may process multiple requests at a time by retrieving the state information stored in its local data store or memory without having to query the DDS for each request. Moreover, a dynamic state application that operates as a web server uses a non-proprietary syntax (e.g., HTTP requests), which is generic and does not require a proprietary syntax. Additionally, the requests may be REST style queries that are easily integrated into existing systems. By implementing a web-based, caching, generalized query, outside queries for state information are easier to configure, faster to process, and distributed to multiple systems.

Figure 2:
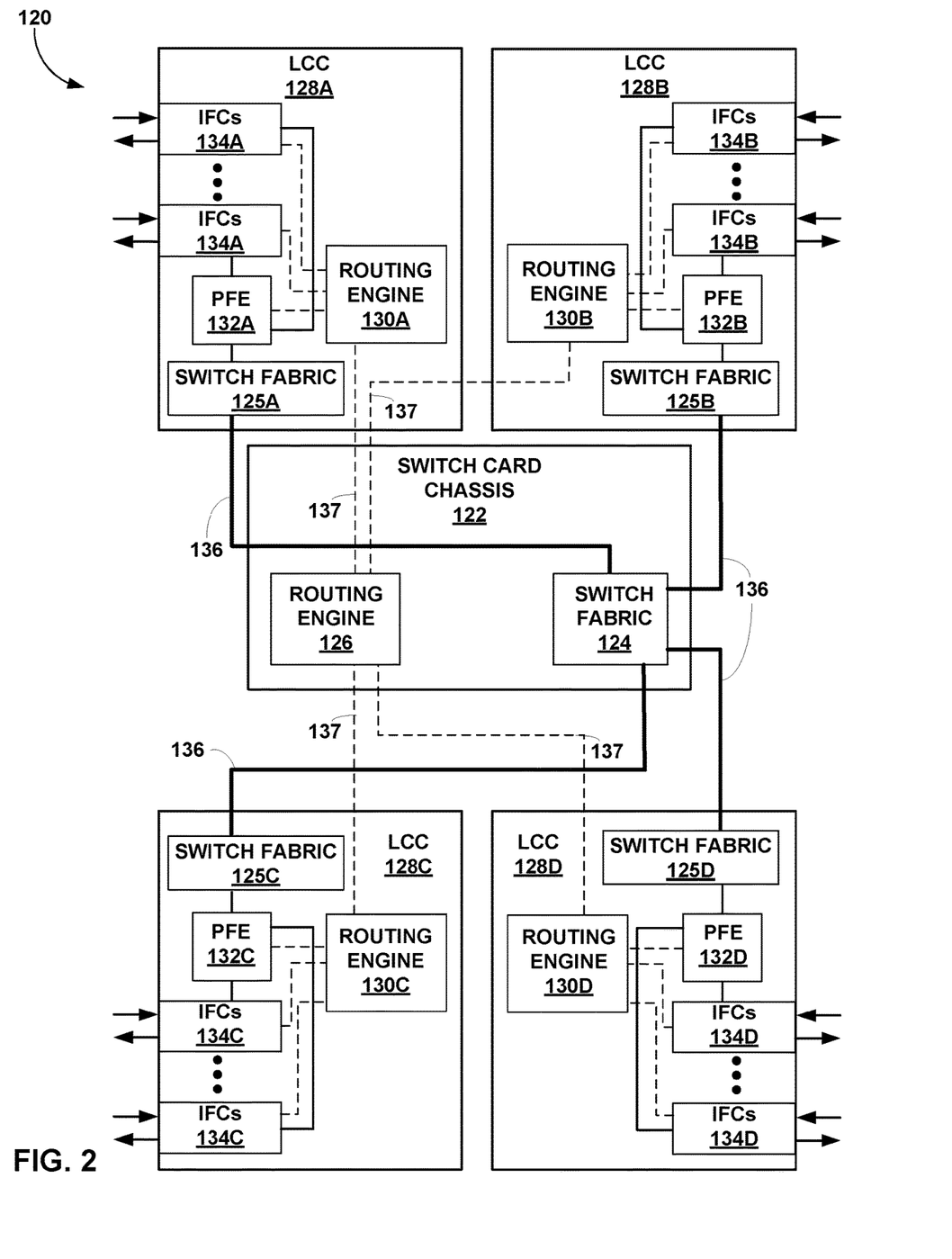
FIG. 2 is a block diagram illustrating an example multi-chassis router executing a distributed operating system that implements a dynamic state application in accordance with the techniques described in this disclosure.

FIG. 2 is a block diagram illustrating an example multi-chassis router 120 configured to operate in accordance with the techniques described in this disclosure. Multi-chassis router 120 of FIG. 2 may represent one example of multi-chassis router 4 of FIG. 1. Multi-chassis router 120 routes data packets between network devices across a network. In this example, multi-chassis router 120 comprises four substantially identical LCCs 128A-128D ("LCCs 128") and SCC 122 that operates as a central control node. In other examples, a multi-chassis router may include more or less LCCs. SCC 122 provides centralized switching and control for multi-chassis router 120. LCCs 128 provide interfaces to a network using IFC sets 134A-134D ("IFCs 134").

SCC 122 includes switch fabric 124 and a master routing engine 126. Although not shown in the example of FIG. 2, SCC 122 may include a standby master routing engine when multi-chassis router 120 is configured as a high-availability router. Switch fabric 124 provides a back-side connection, i.e. a connection separate from the network, between switch fabric 125 of LCCs 128. Functions of master routing engine 126 include maintaining routing information to describe a topology of a network, and using that information to derive forwarding information bases (FIBs). Routing engine 126 controls packet forwarding throughout multi-chassis router 120 by installing the FIB in LCCs 128 via communication with local routing engines 130 over cables 137. A FIB for one of LCCs 128 may be the same or different than a FIB for other LCCs 128 and SCC 122. Because cables 137 provide a dedicated connection, i.e., separate from a data packet forwarding connection provided by cables 136, between SCC 122 and LCCs 128, FIBS in LCC routing engines 130 can be updated without interrupting packet forwarding performance of multi-chassis router 120.

LCCs 128 each contain one of local routing engines 130A-130D ("routing engines 130"), one of switch fabrics 125A-125D ("switch fabric 125"), at least one packet forwarding engine (PFE), shown as PFEs 132A-132D ("PFEs 132"), and one or more IFCs 134. In some examples when multi-chassis router 120 is configured to provide high-availability, LCCs 128 may also include one of standby local routing engines in addition to one of local routing engines 130, which may be referred to as primary local routing engines 130 in the high-availability configuration.

Multi-chassis router 120 performs routing functions in the following manner. An incoming data packet is first received from a network by one of IFCs 134, e.g., 134B, which directs it to one of PFEs 132, e.g., PFE 132B. The PFE then determines a proper route for the data packet using the FIB provided by the primary local routing engine, e.g., routing engine 130B. If the data packet is destined for an outbound link associated with the one of IFCs 134 that initially receive the packet, the PFE forwards the packet to the outbound link. In this manner, packets sent out by the same PFE on which they were received from the network bypass switch fabric 124 and switch fabric 125.

Otherwise, the PFE sends the data packet to switch fabric 125, where it is directed to switch fabric 124 and follows a route to one of the other PFEs 132, e.g., PFE 132D. This PFE, e.g., PFE 132D, sends the data packet across the network via one of IFCs 134, e.g., IFC 134D. Thus an incoming data packet received by one of LCCs 128 may be sent by another one of LCCs 128 to its destination. Other multi-chassis routers that operate in a manner consistent with the techniques described in this disclosure may use different switching and routing mechanisms.

Local routing engines 130 control and manage LCCs 128, but are subservient to master routing engine 126 of SCC 122. For example, after receiving state information updates from master routing engine 126, local routing engines 130 forward the state information update to consumers on LCCs 128 using the hierarchically-ordered and temporally-linked data structure. For example, consumers that receive state information updates from local routing engines 130 include PFEs 132 and IFCs 134. Local routing engines 130 also distribute the FIB derived by primary master routing engine 126 to PFEs 132.

Routing engines 126 and 130 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of multi-chassis router 120 may be implemented by executing the instructions of the computer-readable medium with one or more processors, discrete hardware circuitry, firmware, software executing on a programmable processor, or combinations thereof.

As described above, nodes may include routing engine 126, routing engines 130, PFEs 132, and IFCs 134. Links may include switch fabric 124 and cables 136 and 137, as well as other cables shown but not enumerated for ease of illustration purposes. The various nodes may perform aspects of the techniques described below in more detail with respect to a single node of multi-chassis router 120 shown in FIG. 3.

Figure 3:
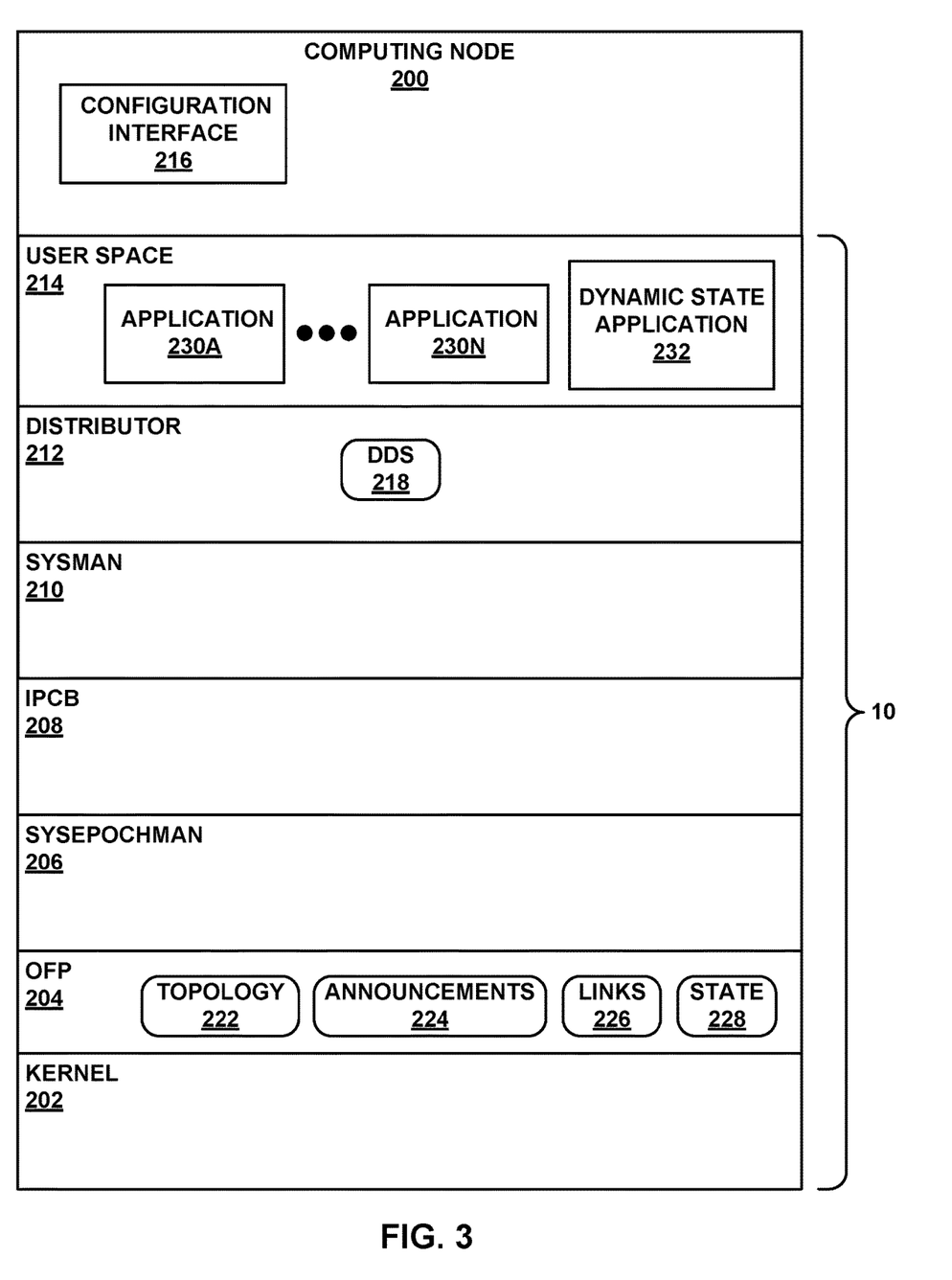
FIG. 3 is a block diagram illustrating an example node of multi-chassis router shown in FIG. 2 configured to operate in accordance with various aspects of the techniques described in this disclosure.

FIG. 3 is a block diagram illustrating an example computing node 200 of multi-chassis router 120 configured to operate in accordance with various aspects of the techniques described in this disclosure. As examples, computing node 200 may represent routing engine 126, one of routing engines 130, switch card chassis 122, or one of line card chassis 128.

As shown in FIG. 3, computing node 200 executes kernel 202 that enables interaction with the hardware of computing node 200. For example, each of the computing nodes executing an instance of distributed operating system 10, including computing node 200, may execute kernel 202, such as a Unix® kernel. Each of the computing nodes may self-organize, coalescing so as to execute the single instance of distributed operating system 10. After self-organizing (or, in other words, coalescing), computing node 200 may execute a single distributed kernel 202 to the extent that kernel 202 is aware of applications (e.g., applications 230A-230N, dynamic state application 232) and/or other processes executed by other computing nodes.

Once kernel 202 is operational, computing node 200 may execute OFP 204, by which to determine a topology 222 of computing nodes executing within multi-chassis router 120 that allows for coalescence and execution by the computing node of the single instance of distributed operating system 10. OFP 204 provides a mechanism by which to discover computing nodes (e.g., computing nodes other than computing node 200) available to participate in execution of distributed operating system 10, and the link interconnecting the computing nodes. Distributed operating system 10 initially executes OFP 204 to determine a topology 222 of computing nodes that allows for coalescence and execution by the computing nodes of the single instance of distributed operating system 10. OFP physical topology discovery may occur in a manner similar to that of link state protocols. OFP 204 may "discover" the links to which the particular instance of OFP 204 is coupled by configuration. That is, a network administrator or other operator may configure OFP 204 with the links to which each particular instance of OFP 204 is coupled.

OFP 204 may discover or otherwise determine topology 222 through receipt of announcements 224. OFP 204 may receive announcements 224 from each of the other computing nodes supporting execution of distributed operating system 10, either as producers or consumers of state information. Each of announcements 224 may specify a computing node and one or more links directly coupled to that computing node. OFP 204 may be configured (e.g., by a network administrator) with links directly coupling to computing node 200. From announcements 224 and links 226, OFP 204 may construct topology 222. Topology 222 may represent a graph data structure including graph nodes representative of the computing nodes of multi-chassis router 120, and edges interconnecting the graph nodes representative of link interconnecting the computing nodes of the multi-chassis router 120. OFP 204 further includes state 228, representing a state data structure, such as a tree data structure (e.g., a radix trie), storing a plurality of objects, each of the objects defining a portion of state information for at least one of distributed operating system 10 or an application executed in an application space provided by distributed operating system 10.

From links 226, OFP 204 may also generate an announcement 224, transmitting the generated one of announcements 224 via the links identified by links 226 so that OFP 204 executed by adjacent computing nodes may likewise generate topology 222. Like link state routing protocols, OFP 204 operates to form a local copy of topology 222 at each of the computing nodes (or, in some instances, only at the primary computing nodes). OFP 204 may flood changes to topology 222 detected by computing node 200 (such as a computing node or a link going down) via announcements 224, thereby allowing topology 222 to remain synchronized at each computing node 200 supporting execution of distributed operating system 10. OFP may expose topology 222 (via an application programming interface—API) to a system epoch management (SysEpochMan) process 206.

SysEpochMan process 206 may organize the (up to this point, distinct and separate) computing nodes to support execution of single distributed operating system 10. SysEpochMan process 206 may also monitor distributed operating system to ensure integrity should one or more computing nodes fail. SysEpochMan process 206 may provide for transitions from the previous system state to the new system state in the event of, to provide a few examples, changes to the number to computing nodes, interruption in inter-node connection, the organization of the computing nodes, and/or changes in computing node rules.

SysEpochMan process 206 may establish (and maintain) a Zookeeper® plane (where Zookeeper® refers to the Apache Zookeeper® project) and the OFP domain (which may refer to an OFP domain for use by distributed operating system 10 to propagate state information particular to distributed operating system 10 and not related to applications). While described with respect to Zookeeper®, the techniques of this disclosure may be performed with respect to any inter-process communication bus or mechanism. As such, Zookeeper® is referred to throughout this disclosure more generally as an inter-process communication bus 208 ("IPCB 208").

IPCB 208 may differ from OFP 204 in that OFP 204 is an asynchronous communication protocol (meaning that OFP may guarantee eventual object delivery without ensuring ordered delivery of the objects) while IPCB 208 is a synchronous communication protocol (meaning that IPCB 208 may ensure delivery with proper ordering of changes, or in other words, all computing nodes receive the changes in the order the changes occur). IPCB 208 may execute within the SysEpochMan process 206 to coordinate services such as leader election (within the computing nodes) and namespace allocation.

After forming IPCB 208 (and assuming OFP 204 is operational), computing node may effectively communicate with other computing nodes of the multi-chassis router to coalesce and execute distributed operating system 10. Computing node 200 may next execute a system manager ("SysMan") process 210 that coordinates the start and execution of applications, e.g., applications 230A-230N ("applications 230") and dynamic state application 232 within the execution environment provided by the distributed operating system. In some examples, SysMan process 210 may spawn dynamic state application 232 on initialization using an initialization policy stored on storage elements (e.g., a hard disk) as instructions with fixed state information. For example, dynamic state application 232 may spawn as part of policy engine startup with configuration information provided by the SysMan process 210. In other examples, SysMan process 210 may spawn dynamic state application 232 in response to configuration information (e.g., via a configuration file) pushed to the storage element (e.g., a dedicated hard disk area) of the network device and/or by executing spawn via the CLI (e.g., Data Stream Architecture (DSA) type commands). Each spawn of dynamic state application 232 may be based on a respective configuration file and/or a global configuration file.

Each of SysMan processes 210 of computing nodes may elect a SysMan master instance (e.g., using ICPB 208), which may be responsible for execution of applications on particular computing nodes according to, as one example, a policy engine.

The SysMan master process may communicate (e.g., via IPCB 208) the application decisions to the local SysMan processes that then act on the application decisions to execute the applications. The local SysMan processes monitor the executing of the applications and provide a status of the application to the SysMan master process to allow the SysMan master process to monitor the status of the applications. When the status indicates that an application has failed, the SysMan master process may, to provide a few examples, reinitiate execution of the application (by the same or a different computing node) or activate a standby instance of the application.

Computing node 200 may also execute a distributor process 212 as part of distributed operation system 10. Distributor process 212 may form an object daemon data store (DDS), e.g., DDS 218, and coordinate with individual applications for delivery of state information. DDS 218 may coordinate with state 228 of computing node 200 with state information data structures of other computing nodes executing an instance of distributed operating system 10. For example, distributor process 212 identifies which objects stored in a state information data structure, e.g., state 228, that are out of date and synchronizes with the other compute nodes to synchronize the objects of the data structure.

Distributor 212 may operate as a client to OFP 204, and deliver objects between distributors executed by the different computing nodes.

Computing node 200 may be configured to synchronize state 228 with corresponding data structures of other nodes executing other instances of distributed operating system 10. In general, state 228 may be considered synchronized with data structures of the other nodes executing the other instances of distributed operating system 10 when tree data structures of each of the nodes executing instances of distributed operating system 10 have a common arrangement and interconnection of tree nodes within each of the tree data structures, and when corresponding tree nodes of the tree data structures have the same digest values.

Computing node 200 may further determine whether or not state 228 is synchronized with state data structures of other nodes executing other instances of distributed operating system 10. Computing node 200 may recursively walk the tree nodes of a tree data structure representing state 228. If local digests of tree nodes of the tree data structure representing state 228 match digests of corresponding tree nodes of tree data structures of nodes executing other instances of distributed operating system 10, computing node 200 may determine that the tree nodes are synchronized. Otherwise, computing node 200 may determine that an update to state 228 is necessary.

If an update is necessary, computing node 200 may determine whether its version of state 228 is most current, or if another version of a tree data structure storing state information of a different node executing another instance of distributed operating system 10 is most current. If the version of a tree node of a tree data structure representing state 228 of computing node 200 is most current (e.g., has a most current logical clock value), computing node 200 may send message fragment data for the tree node of the tree data structure representing state 228 to one or more of the other nodes executing other instances of distributed operating system 10. Otherwise, if the version of the tree node of the tree data structure representing state 228 of computing node 200 is not most current, computing node 200 may receive message fragment data for the tree node of the tree data structure representing state 228 from a different one of the other nodes executing another instance of distributed operating system 10 that is most current, and update the tree node of the tree data structure representing state 28 with the received message fragment data.

Further examples of a software stack of distributed operating system 10 is described in U.S. application Ser. No. 15/637,775, U.S. application Ser. No. 15/637,809, and U.S. application Ser. No. 15/637,839, incorporated above.

In accordance with the techniques described herein, computing node 200, and in some instances other computing nodes, may configure dynamic state application 232 to operate as a proxy to receive one or more requests for state information stored in DDS 218.

Computing node 200 may include a configuration interface 216 that receives configuration information for computing node 200. Configuration interface 216 may represent a command line interface; a graphical user interface; Simple Network Management Protocol (SNMP), Network Configuration Protocol (Netconf), or another configuration protocol; or some combination of the above in some examples. Configuration interface 216 may receive configuration information as described below in more detail with respect to the configuration information 404 of FIG. 4.

Computing node 200 configures, e.g., via SysMan process 210, dynamic state application 232 as an application of user space 214. User space 214 may represent an execution environment of distributed operating system 10. User space 214 may also include other applications, e.g., applications 230A-230N that may represent user-level processes that may run network management software, execute routing protocols to communicate with peer routing devices, execute configuration commands received from an administrator, maintain and update one or more routing tables, manage subscriber flow processing, create one or more forwarding tables, among other functions. Applications 230 may refer to any process that is not described above with respect to distributed operating systems 10, including Unix® daemons, and PFE applications (or, in other words, software) other than low level drivers and/or firmware.

Based on the configuration information received by configuration interface 216, computing node 200 may configure dynamic state application 232 to operate as a proxy to receive one or more requests (e.g., HTTP requests) from a service endpoint, and to configure responses, e.g., Hyper-Text Markup Language (HTML) file, with state information stored in its local data store or memory. To configure dynamic state application 232, computing node 200 may receive configuration information that defines one or more instances in which computing node 200 may implement dynamic state application 232 and state information to retrieve from DDS 218 to be stored in a local data store or memory of computing device 200. The configuration information may further define instructions that cause computing node 200 to expose an interface (e.g., port) to receive one or more requests from a service endpoint, e.g., web client, and the format of a response to the one or more requests.

Figure 4:
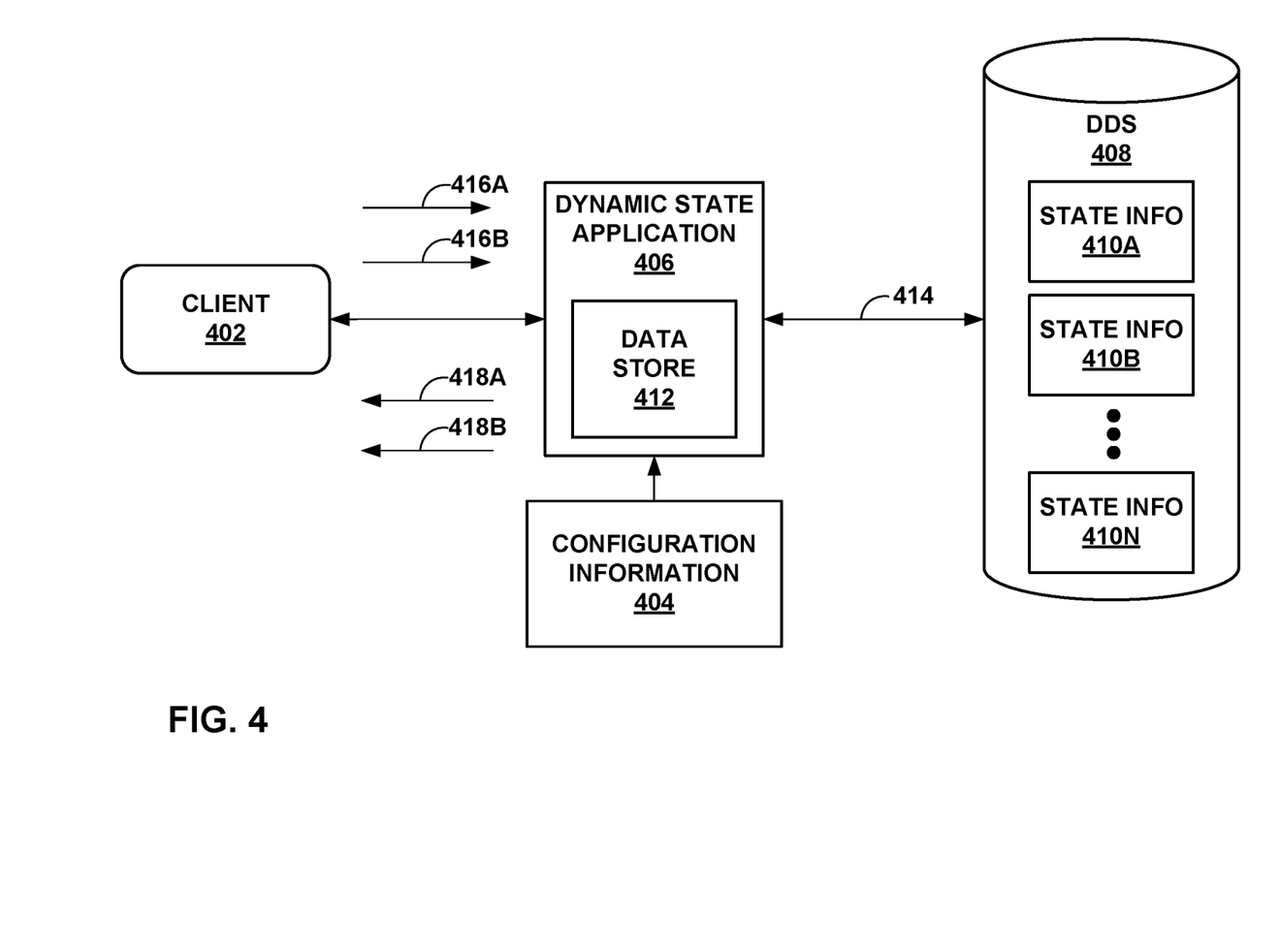
FIG. 4 is a block diagram illustrating an example operation of a dynamic state application in accordance with techniques of this disclosure.

FIG. 4 is a block diagram illustrating an example operation of a dynamic state application in accordance with techniques of this disclosure. In the example of FIG. 4, a plurality of computing nodes executes a distributed operating system that provides an execution environment in which a plurality of applications is executed. At least one of the plurality of computing nodes configures dynamic state application 406 to operate as a proxy to receive one or more requests for state information 410A-410N (collectively, "state information 410") stored in DDS 408. The computing node that executes an instance of dynamic state application 406 may configure the dynamic state application 406 based on configuration information 404.

Configuration information 404 may define one or more instances in which compute nodes that execute the distributed operating system 10 may implement dynamic state application 406 to serve different objects of state information 410. For example, the configuration file may define a first computing node (e.g., computing node 200 of FIG. 3) to execute a first instance of dynamic state application 406 to provide a view of a first subset of the state information, e.g., state information 410A (e.g., routing state information), and a second computing node to execute a second instance of dynamic state application 406 to provide a view of a second subset of the state information, e.g., state information 410B (e.g., interfaces state information).

The following is an example of configuration information 404 for a computing node executing an instance of dynamic state application 406:

```
{
    "ServerParameters" : {
        "port" : "8888",
        "Authentication" : "No"
    },
    "ServingParameters" : {
        "InterfaceSpeed" : {
            "Args" : ["InterfaceName"],
            "OutputFormat" : "{{Interface}, {Speed}}",
        },
        "InterfaceList" : {
            "OutputFormat" : "[Interface]"
        }
    }
}
```

The computing device that executes an instance of dynamic state application 406 may use configuration information 404 to configure the computing device to receive one or more requests from client 402. In the example configuration information shown above, the computing device may expose an interface (e.g., "port": "8888") of the computing device to receive one or more requests from a service endpoint, e.g., client 402. The configuration information may also define an authentication (or that an authentication is not required) to access the dynamic state application 22. In this way, dynamic state application 406 may operate as a web server to receive one or more web-based requests (e.g., HTTP get requests) from web clients and to retrieve state information 410 from DDS 408.

The computing device that executes an instance of dynamic state application 406 may use configuration information 404 to define a format of a response. In the example configuration information shown above, the computing device is configured to generate a response for a request for interface speed (e.g., "InterfaceSpeed") to include an Interface Name and speed of the interface (e.g., (e.g., "{{Interface}, {Speed}}") and/or a response for a request for an interface list (e.g., "InterfaceList") to include the set of interfaces (e.g., "[Interface]").

Configuration information 404 may also instruct the computing node that executes a respective instance of dynamic state application 406 to construct a local data store 412 that stores state information, e.g., state information 410, in the local data store 412. For example, the configuration information may instruct dynamic state application 406 to retrieve state information from DDS 408 during initialization and each time the state information in the DDS 408 is updated. Local data store 412 may map objects of state information 410 retrieved from DDS 408 to responses for requests from client 402.

Assume for example configuration information 404 defines dynamic state application 406 to serve state information 410A (e.g., interface state information) of DDS 408. Dynamic state application 406 may, during initialization or an update to DDS 408, retrieve state information 410A (retrieval process 414) and store the retrieved state information 410A in data store 412. Dynamic state application 406 may then receive one or more requests 416A, 416B ("requests 416") from client 402 for one or more objects of state information 410A. For example, client 402 may use a web client to configure and send the request 416A, e.g., HTTP get request, to retrieve state information 410A (e.g., interface speed) from DDS 408. As one example, client 402 may generate and send a request (e.g., HTML request) 416A for interface state information (e.g., interface speed), such as the following: http://192.168.1.70:8888/DynamicState/InterfaceSpeed?InterfaceName=et-0/0/0.

Dynamic state application 406 may receive request 416A and retrieves state information 410A from data store 412. Dynamic state application 406 may configure a response 418A with the state information in data store 412.

Continuing the example above, the computing node may generate a response 418A for a request 416A for the interface speed as follows:

```
{
    "status" : "OK",
    "data" :
        [{"Interface" : "et-0/0/0",
        "Speed" : "40000"
        }]
}
```

As another example, client 402 may generate and send a request 416B for an interface list (e.g., interface speed), such as the following: http://192.168.1.70:8888/DynamicState/InterfaceList. In some examples, client 402 may send requests 416A and 416B at the same, or near the same time.

Dynamic state application 406 may receive request 416B and retrieves state information 410A from data store 412. Dynamic state application 406 may configure a response 418B with the state information in data store 412.

Continuing the example above, the computing node may generate a response 418B for a request 416B for the interface list as follows:

```
{
    "status" : "OK",
    "data" :
        [{"Interfaces" : "ae0", "et-0/0/0", "et-0/0/1", "gr-1/0/1"}]
}
```

In some examples, dynamic state application 406 may configure responses 418A, 418B ("responses 418") as an HTML file, with one or more HTML tags. The HTML tags may indicate to a web client browser that the response is an HTML file, and may also include other attributes associated with the HTML file.

Figure 5:
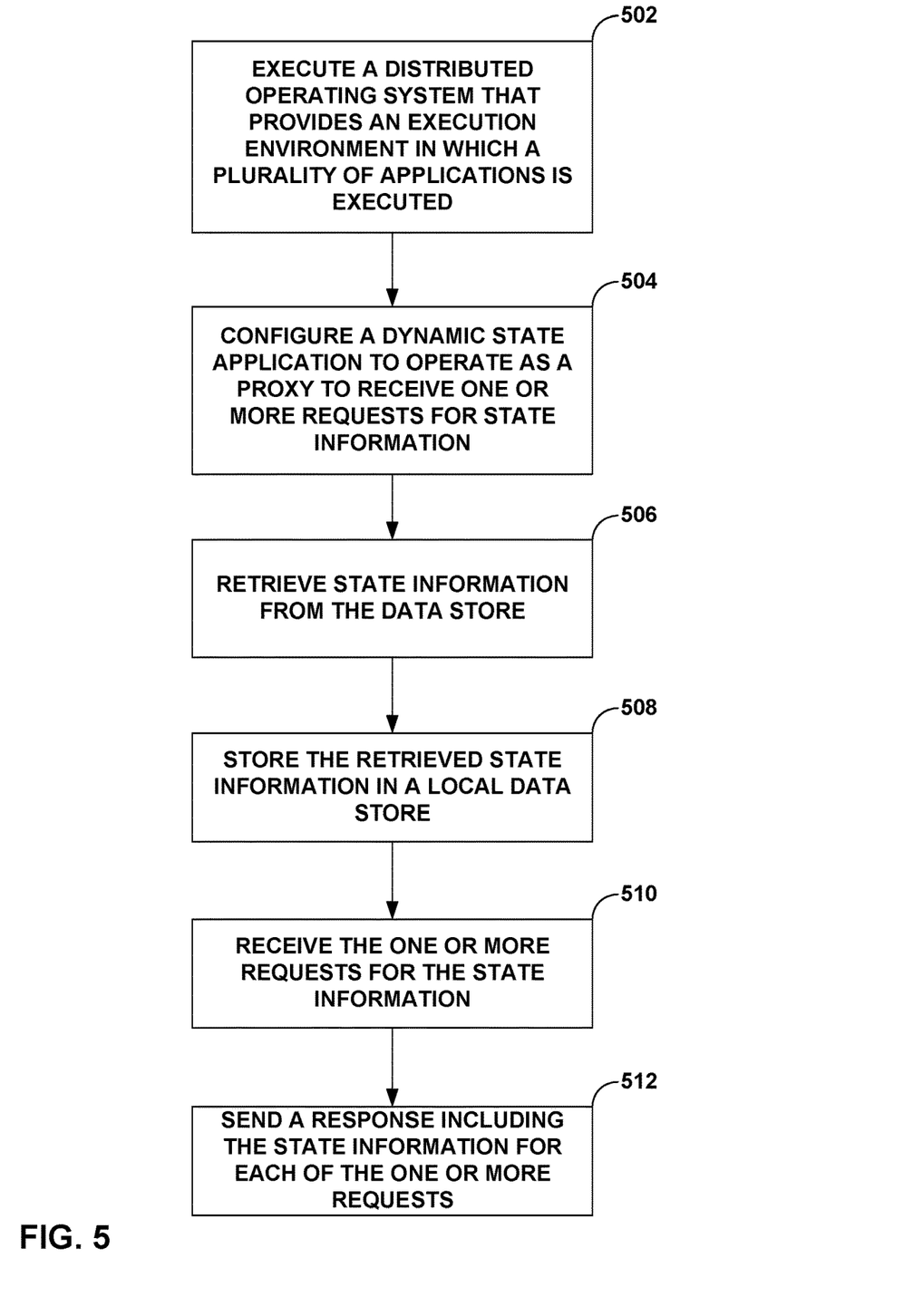
FIG. 5 is a flowchart illustrating an example operation of a multi-chassis router shown in FIG. 3 in performing various aspects of the techniques described in this disclosure.

FIG. 5 is a flowchart illustrating an example operation of a multi-chassis router shown in FIG. 3 in performing various aspects of the techniques described in this disclosure. In this example, a plurality of computing nodes included within a network device may execute a distributed operating system that provides an execution environment in which a plurality of applications is executed (502). For example, a plurality of routing engines, e.g., routing engines 130 of FIG. 2, may each execute an instance of a distributed operating system. The distributed operating system provides an execution environment in which applications of a user space are executed. Each of the applications may produce state information that is stored in distributed data store, e.g., DDS 24 of FIG. 1.

At least one of the plurality of computing nodes configures a dynamic state application to operate as a proxy to receive one or more requests or state information (504). For example, the computing node that configures the dynamic state application may receive a configuration file that defines the one or more instances in which the computing node may implement dynamic state application. For example, the configuration file may define fields of the DDS from which the dynamic state application is to retrieve data. The configuration file may also instruct the computing node to expose an interface (e.g., port) to receive one or more requests from a service endpoint, e.g., web client. In this way, the computing node that is executing an instance of the dynamic state application may receive web requests, e.g., a HyperText Transport Protocol (HTTP) get requests. That is, the dynamic state application may operate as a web server to receive one or more web-based requests from web clients. The configuration information may instruct the computing node that executes a respective instance of dynamic state application to retrieve state information from DDS 24 and store the retrieved state information in a local data store or memory of the computing device.

Dynamic state application may retrieve state information from the data store (506) and store the retrieved state information in a local data store (508). For example, dynamic state application may, during initialization, retrieve state information from DDS 24 and store the retrieved state information in a local data store or memory. Dynamic state application may also retrieve state information from DDS 24 when state information is updated.

Dynamic state application may receive one or more requests for state information (510). For example, the computing node that executes an instance of the dynamic state information may receive one or more requests, such as HTTP get requests, for state information in the DDS. The computing node may pass the request to the dynamic state application, which retrieves state information corresponding to the one or more requests from the local data store.

Dynamic state application may configure and send a response with the retrieved state information from the local data store (512). For example, dynamic state application may configure a response as an HTML file, including one or more HTML tags.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
    executing, by a plurality of hardware computing nodes included within a network device, a distributed operating system that provides an execution environment in which a plurality of applications that provide networking functions is executed;
    instantiating, by at least one of the plurality of hardware computing nodes, a dynamic state application to operate as a proxy application to retrieve state information stored in a distributed data store that synchronizes state information across the plurality of hardware computing nodes and to receive, from a client service endpoint, one or more requests for the state information, wherein the state information comprises information representing different states for the plurality of applications distributed among the plurality of hardware computing nodes,
        wherein instantiating the dynamic state application comprises configuring the at least one of the plurality of hardware computing nodes instantiated with the dynamic state application with an interface to receive the one or more requests for the state information;
    retrieving, by the dynamic state application, the state information stored in the distributed data store;
    storing, by the dynamic state application, the retrieved state information in a local data store of the at least one of the plurality of hardware computing nodes instantiated with the dynamic state application;
    subsequent to storing the retrieved state information in the local data store, receiving, by the dynamic state application, the one or more requests for the state information from the client service endpoint via the interface; and
    responsive to receiving the one or more requests, sending, by the dynamic state application and to the client service endpoint, a response including the requested state information from the local data store without sending the one or more requests to the distributed data store.

2. The method of claim 1, wherein instantiating the dynamic state application comprises instantiating the dynamic state application to operate as a web server.

3. The method of claim 1, wherein instantiating the dynamic state application comprises exposing an interface of the at least one of the plurality of hardware computing nodes to receive the one or more requests for state information from a web client.

4. The method of claim 1, wherein the one or more requests comprises Hypertext Transport Protocol (HTTP) get requests.

5. The method of claim 1, wherein sending the response comprises sending the response including one or more Hypertext Markup Language (HTML) tags identifying the requested state information.

6. The method of claim 1, wherein instantiating the dynamic state application comprises instantiating the dynamic state application based on configuration information defining an instance of the dynamic state application and construct the local data store to store the state information of the distributed data store.

7. The method of claim 6, wherein sending the response comprises sending the response without performing a query to the distributed data store.

8. A network device comprising:
a plurality of hardware computing nodes configured to execute a distributed operating system that provides an execution environment in which a plurality of applications that provide networking functions is executed, wherein at least one of the plurality of hardware computing nodes configured to:
instantiate a dynamic state application to operate as a proxy application to retrieve state information stored in a distributed data store that synchronizes state information across the plurality of hardware computing nodes and to receive, from a client service endpoint, one or more requests for the state information, wherein the state information comprises information representing different states for the plurality of applications distributed among the plurality of hardware computing nodes,
wherein to instantiate the dynamic state application, the at least one of the plurality of hardware computing nodes configures an interface to receive the one or more requests for the state information;
retrieve the state information stored in the distributed data store;
store the retrieved state information in a local data store of the at least one of the plurality of hardware computing nodes instantiated with the dynamic state application;
subsequent to storing the retrieved state information in the local data store, receive the one or more requests for the state information from the client service endpoint via the interface; and
send, responsive to receiving the one or more requests and to the client service endpoint, a response including the requested state information from the local data store without sending the one or more requests to the distributed data store.

9. The network device of claim 8, wherein, to instantiate the dynamic state application, the at least one of the plurality of hardware computing nodes is further configured to instantiate the dynamic state application to operate as a web server.

10. The network device of claim 8, wherein, to instantiate the dynamic state application, the at least one of the plurality of hardware computing nodes is further configured to expose an interface of the at least one of the plurality of hardware computing nodes to receive the one or more requests for state information from a web client.

11. The network device of claim 8, wherein the one or more requests comprises Hypertext Transport Protocol (HTTP) get requests.

12. The network device of claim 8, wherein, to send the response, the at least one of the plurality of hardware computing nodes is further configured to send the response including one or more Hypertext Markup Language (HTML) tags identifying the requested state information.

13. The network device of claim 8, wherein, to instantiate the dynamic state application, the at least one of the plurality of hardware computing nodes is further configured to instantiate the dynamic state application based on configuration information defining an instance of the dynamic state application and construct the local data store to store the state information of the distributed data store.

14. The network device of claim 13, wherein, to send the response, the at least one of the plurality of hardware computing nodes is further configured to send the response without performing a query to the data store.

15. A non-transitory computer-readable storage medium having stored thereon instructions that, when executed, cause one or more processors of a network device to:
execute a distributed operating system that provides an execution environment in which a plurality of applications that provide networking functions is executed;
instantiate a dynamic state application to operate as a proxy application to retrieve state information stored in a distributed data store that synchronizes state information across the plurality of hardware computing nodes and to receive, from a client service endpoint, one or more requests for the state information, wherein the state information comprises information representing different states for the plurality of applications distributed among the plurality of hardware computing nodes,
wherein to instantiate the dynamic state application, the instructions further cause the one or more processors to configure the at least one of the plurality of hardware computing nodes instantiated with the dynamic state application with an interface to receive the one or more requests for the state information;
retrieve the state information stored in the distributed data store;
store the retrieved state information in a local data store of the at least one of the plurality of hardware computing nodes instantiated with the dynamic state application;
subsequent to storing the retrieved state information in the local data store, receive, from the client service endpoint via the interface, the one or more requests for the state information; and
send, responsive to receiving the one or more requests and to the client service endpoint, a response including the requested state information from the local data store without sending the one or more requests to the distributed data store.

16. The non-transitory computer-readable storage medium of claim 15, further having stored thereon instructions that, when executed, cause the one or more processors to:
instantiate the dynamic state application to operate as a web server.

17. The non-transitory computer-readable storage medium of claim 15, further having stored thereon instructions that, when executed, cause the one or more processors to:
expose an interface of at least one of a plurality of hardware computing nodes that execute the distributed operating system to receive the one or more requests for state information from a web client.

18. The non-transitory computer-readable storage medium of claim 15, wherein the one or more requests comprises Hypertext Transport Protocol (HTTP) get requests.

19. The non-transitory computer-readable storage medium of claim 15, wherein the response includes one or more Hypertext Markup Language (HTML) tags identifying the requested state information.

20. The non-transitory computer-readable storage medium of claim 15, further having stored thereon instructions that, when executed, cause the one or more processors to:
   instantiate the dynamic state application based on configuration information defining an instance of the dynamic state application and construct the local data store to store the state information of the data store.

\* \* \* \* \*